(12) United States Patent
Matsumoto (10) Patent No.: US 7,929,039 B2
(45) Date of Patent: Apr. 19, 2011

(54) IMAGE REPRODUCING APPARATUS AND METHOD OF CONTROLLING THE IMAGE REPRODUCING APPARATUS

(75) Inventor: Shinya Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 11/859,536

(22) Filed: Sep. 21, 2007

(65) Prior Publication Data

US 2008/0158405 A1 Jul. 3, 2008

(30) Foreign Application Priority Data

Dec. 27, 2006 (JP) ................................. 2006-351531

(51) Int. Cl.
*H04N 5/222* (2006.01)
(52) U.S. Cl. ......... 348/333.03; 348/333.01; 348/333.02; 348/207.1
(58) Field of Classification Search ............. 348/333.01, 348/333.02, 333.03, 207.1
See application file for complete search history.

(56) References Cited

U.S. PATENT DOCUMENTS

| | | | |
|---|---|---|---|
| 7,034,881 B1 | 4/2006 | Hyodo et al. | |
| 2002/0047944 A1* | 4/2002 | Sato ............................. | 348/734 |
| 2005/0177800 A1* | 8/2005 | Suzuki et al. ................. | 715/823 |
| 2005/0190277 A1* | 9/2005 | Juen et al. ..................... | 348/310 |
| 2005/0216862 A1* | 9/2005 | Shinohara et al. ............ | 715/825 |
| 2005/0259948 A1* | 11/2005 | Ando .............................. | 386/46 |
| 2006/0046774 A1* | 3/2006 | Fukuda ........................ | 455/556.1 |
| 2006/0187331 A1* | 8/2006 | Watanabe et al. .......... | 348/333.01 |
| 2007/0132853 A1* | 6/2007 | Shiota et al. ............. | 348/207.99 |
| 2007/0140579 A1* | 6/2007 | Miyashita ..................... | 382/254 |

FOREIGN PATENT DOCUMENTS

| | | |
|---|---|---|
| JP | 6-070206 A | 3/1994 |
| JP | 11-136568 A | 5/1999 |

* cited by examiner

*Primary Examiner* — Jason Chan
*Assistant Examiner* — Usman Khan
(74) *Attorney, Agent, or Firm* — Canon USA, Inc. IP Division (57) ABSTRACT

An image reproducing apparatus includes a selector which selects output of the MPEG decoder in a reproducing mode. A connection detection unit detects whether a video monitor is connected to an output terminal and a result of the detection is sent to a CPU. When a video monitor is connected, the CPU reads out bit map data of an operation icon having an enlarged size from a ROM and sends the data to an OSD control unit. The OSD control unit determines whether a blue background is displayed on a touch panel. If the operation icon is not enlarged, the OSD control unit masks a background portion with a single color (for example, blue background) and displays an enlarged operation icon over the background portion.

6 Claims, 12 Drawing Sheets

DISPLAY SET-UP

TV SCREEN .... "ON"

AUDIO LEVEL .... "ON"

LANGUAGE .... ENGLISH

DATA CODE .... DATE AND TIME

ICON ENLARGEMENT .... "ON"

← BACK

| CTS=0000 | ctype/ response | subunit type | id | opcode | operand[0] |
|---|---|---|---|---|---|
| operand[1] | . . . . . | | | | |

| | MSB | | | | | | | LSB |
|---|---|---|---|---|---|---|---|---|
| opcode | \multicolumn{8}{c}{UNIT INFO($30_{16}$)} |
| operand[0] | \multicolumn{8}{c}{$17_{16}$} |
| operand[1] | \multicolumn{6}{c}{unit type} | \multicolumn{2}{c}{unit} |
| operand[2] | \multicolumn{8}{l}{(most significant byte)} |
| operand[3] | \multicolumn{8}{c}{company_ID} |
| operand[4] | \multicolumn{8}{r}{(least significant byte)} |

FIG.12

| Subunit type | Meaning |
|---|---|
| $00_{16}$ | Video Monitor |
| $01_{16}$ | Audio |
| $02_{16}$ | Printer |
| $03_{16}$ | Disc recorder/player |
| $04_{16}$ | Tape recorder/player |
| $05_{16}$ | Tuner |
| $06_{16}$ | Conditional Access |
| $07_{16}$ | Camera |
| $08_{16}$ | Reserved |
| $09_{16}$ | Panel |
| $0A_{16}$ | Bulletin Board |
| $0B_{16}$ | Camera Storage |
| $0C_{16}$-$1B_{16}$ | Reserved |
| $1C_{16}$ | Vendor Unique |
| $1D_{16}$ | Reserved |
| $1E_{16}$ | subunit_type extended to next byte |
| $1F_{16}$ | Unit |

IMAGE REPRODUCING APPARATUS AND METHOD OF CONTROLLING THE IMAGE REPRODUCING APPARATUS

BACKGROUND OF THE INVENTION

1. Field of the Invention

The present invention relates to an image reproducing apparatus and a controlling method. More particularly, the present invention relates to an image reproducing apparatus having a touch panel, and a controlling method therefor.

2. Description of the Related Art

In recent years, widespread use of touch panels has led electronics manufacturers to adopt a touch screen as a user interface component of electronic equipment. A liquid crystal display having a touch screen eliminates a need for a mechanical operation button since the operation button is displayed on the liquid display panel that is integrated with the touch panel, and thus contributes to providing a space-saving design of the electronic equipment. Accordingly, touch panels are advantageous especially when used in small electronic equipment. The touch panels are also convenient since an arrangement of operation buttons on the touch panel screen can be changed depending on conditions.

For example, Japanese Patent Application Laid-Open No. 6-070206 and Japanese Patent Application Laid-Open No. 11-136568 (U.S. Pat. No. 7,034,881) discuss a technique which enables a user to easily perform focusing and photometric setting of a digital camera using a touch panel.

However, a touch panel of small electronic equipment such as a digital video camcorder is generally not so large. Since a user needs to operate the touch panel while checking an image, a space of an operation icon is inevitably small and is not user-friendly for the user having a larger hand.

When a digital video camcorder is used, for example, after shooting in the open, the user generally connects the digital video camcorder to a monitor such as a television to view the shot images. Since the user can view the images on the monitor, the images are not necessarily required to be displayed on the liquid crystal display panel of the digital video camcorder having a touch panel.

SUMMARY OF THE INVENTION

The exemplary embodiments of the present invention are directed to an image reproducing apparatus having a touch panel with improved operability and a control method of such an image reproducing apparatus.

According to one aspect of the present invention, an image reproducing apparatus includes a reproduction unit configured to reproduce a recorded image from a recording medium and output a reproduced image signal, an image outputting unit configured to output the reproduced image signal to an external equipment, a connection detection unit configured to detect a connection of the image outputting unit with the external equipment, an image displaying unit configured to display a first operation icon of a first size when the external equipment is not connected to the image outputting unit, and displays a second operation icon of a second size which is larger than the first size when the external equipment is connected to the image outputting unit, according to a detection result by the connection detection unit, a touch panel configured to transmit an image displayed by the image displaying unit, and an operation accepting unit configured to accept an operation of the touch panel performed in an area corresponding to a size of an operation icon displayed on the image displaying unit.

According to another aspect of the present invention, a method of controlling an image reproducing apparatus is provided. The image reproducing includes a reproduction unit configured to reproduce a recorded image from a recording medium and output a reproduced image signal, an image outputting unit configured to output the reproduced image signal to an external equipment, a connection detection unit configured to detect a connection of the image outputting unit with the external equipment, an image displaying unit configured to display an operation icon, and a touch panel configured to transmit an image displayed by the image displaying unit. The method includes controlling the image reproducing apparatus to display a first operation icon of a first size on the image displaying unit as an operation icon according to a result of a detection by the connection detection unit when the external equipment is not connected to the image outputting unit, and controlling the image reproducing apparatus to display a second operation icon of a second size which is larger than the first size on the image displaying unit, according to a result of a detection by the connection detection unit when the external equipment is connected to the image outputting unit.

According to yet another aspect of the present invention, since the enlarged operation icon is displayed on the touch panel when the image output unit is connected to the external equipment, operability is improved and operation of the touch panel becomes easier for a user. Especially, touch-typing can be easily performed.

According to yet another aspect of the present invention, since it is easily determined whether the external equipment includes image displaying equipment when a digital interface is used, control can be performed to display an enlarged operation icon when image displaying equipment is connected. In other words, when equipment other than image displaying equipment is connected to the image reproducing apparatus as external equipment, the operation icon will be prevented from becoming enlarged.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the invention.

DETAILED DESCRIPTION OF THE EMBODIMENTS

Various exemplary embodiments, features and aspects of the present invention will now herein be described in detail below with reference to the drawings.

First Exemplary Embodiment

Figure 1:
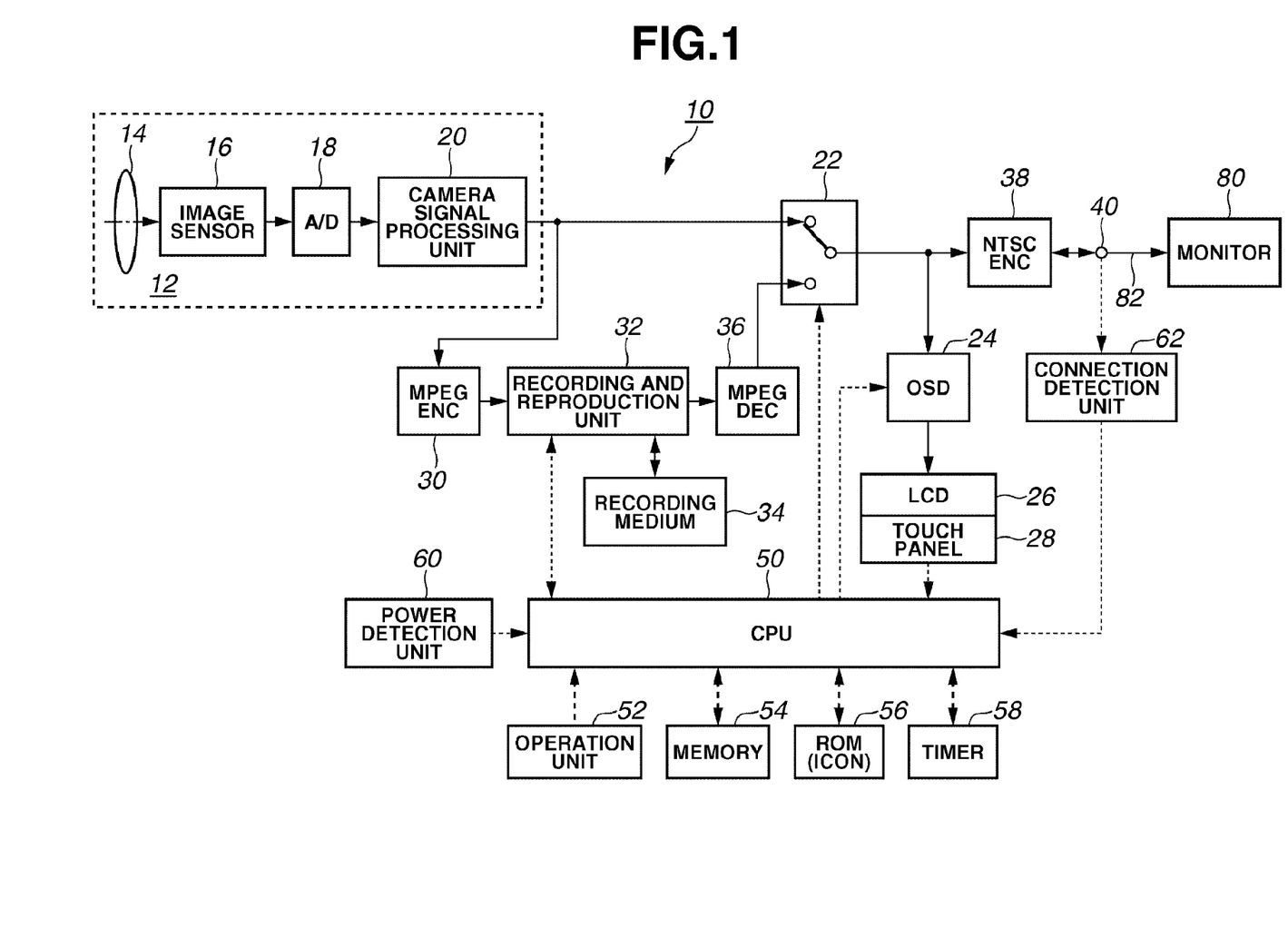
FIG. 1 illustrates a block diagram of an example imaging apparatus according to a first exemplary embodiment of the present invention.

FIG. 1 illustrates a block diagram of an imaging apparatus according to a first exemplary embodiment of the present invention. In FIG. 1, a solid line represents a flow of image data and a broken line represents a flow of a control signal such as an enable signal. It is also noted that an audio processing system, which is not related to the present invention, is omitted from the illustration.

An imaging apparatus 10 is, for example, a digital video camcorder or a digital still camera. A video monitor 80 or an image monitor adapted to display a reproduced image is connected to the imaging apparatus 10 via a digital cable 82.

The imaging apparatus 10 includes an imaging unit 12, that is, a shooting lens 14, an image sensor 16, an analog to digital (A/D) converter 18 and a camera signal processing unit 20. The shooting lens 14 forms an optical image of a subject on the image sensor 16. The image sensor 16 converts the optical image taken by the shooting lens 14 into an electric image signal. The image sensor 16 is, for example, a charge coupled device (CCD) image sensor or a complementary metal oxide semiconductor (CMOS) image sensor.

The A/D converter 18 converts the signal output from the image sensor 16 into a digital image signal. The camera signal processing unit 20 performs a known signal processing on the digital image signal output from the A/D converter 18 (e.g., gamma correction, color balance adjustment, luminance/color separation). A selector 22 selects output from the camera signal processing unit 20 in a shooting mode but selects output from a Moving Picture Experts Group (MPEG) decoder 36 in a reproducing mode.

An MPEG encoder 30 is operated when the imaging apparatus 10 is in a shooting mode or a recording mode. The MPEG encoder 30 compresses and encodes the digital image signal output from the camera signal processing unit 20 by a moving picture compression system or by a still image compression system to generate compressed image data. The moving picture compression system is, for example, MPEG 2, MPEG 4 or Motion Joint Photographic Experts Group (Motion JPEG). The still image compression system is, for example, JPEG or JPEG 2000. A recording and reproduction unit 32 records the image data compressed by the MPEG encoder 30 on a recording medium 34. The recording medium 34 includes a nonvolatile semiconductor memory (so-called memory card), a magnetic disk such as a hard disk drive (HDD), or a recordable and reproducible optical disk compliant with, for example, a digital versatile disk (DVD) format.

Further, the recording and reproduction unit 32 reads out compressed image data of a specified image from the recording medium 34 in a reproducing mode and sends the compressed image data to the MPEG decoder 36. The MPEG decoder 36 decompresses and decodes the compressed image data sent from the recording and reproduction unit 32. The decoded image data is then sent to the selector 22.

An on-screen display (OSD) control unit 24 functions as a superposing apparatus adapted to superpose menu information and an operation icon received from the CPU 50 on a digital image signal output from the selector 22 or on a single-color background image signal such as blue-screen. The OSD control unit 24 drives a liquid crystal display (LCD) 26 according to a result of the superimposing. In this way, a shot image or a reproduced image is displayed on the LCD 26. A translucent touch panel 28 is arranged on a display screen of the LCD 26 so that the user can see the image displayed on the LCD 26 through the touch panel 28. The touch panel 28 includes a sensor which senses pressure or static electricity in a two-dimensional manner.

An NTSC encoder 38 converts a digital image signal output from the selector 22 into a video signal conforming to the National Television Standards Committee (NTSC) format. The video signal output from the NTSC encoder 38 is supplied to a video monitor 80 through a digital video output terminal 40 such as high-definition multimedia interface (HDMI) and a cable 82.

A central processing unit (CPU) 50 controls the entire imaging apparatus 10. The CPU 50 includes a micro processing unit (MPU) or a microcomputer. Further, the CPU 50 functions as an operation-accepting device adapted to accept operation performed in an area of the touch panel 28 corresponding to a size of the operation icon displayed on the LCD 26.

An operation unit 52 includes a mode dial, a release switch, a moving image shooting switch, a play switch, a stop switch, a menu button, a cross key, an enter button, etc. The user uses the mode dial to change an operation mode such as a power on/off mode, a shooting mode, a recording mode, and a reproducing mode. The release switch is used when the user takes still images. The moving image shooting switch is used when the user starts or stops shooting of a moving image. The play switch is used for starting a reproducing operation and the stop switch is used for stopping the reproducing operation. The menu button is used for displaying a menu screen. The cross key and the enter button are used for selecting and determining various settings.

A memory 54 includes a random access memory (RAM) and an electronically erasable and programmable read only memory (EEPROM) which retains a setting value even when power is turned off. The RAM serves as a working buffer adapted to process or transfer record data, and further serves as a temporary storage of various settings. Furthermore, the RAM is used for storing data and commands supplied from an external interface or data and commands sent to an external interface. The EEPROM of the memory 54 stores, for example, a setting selected in the menu screen.

Figure 2A:
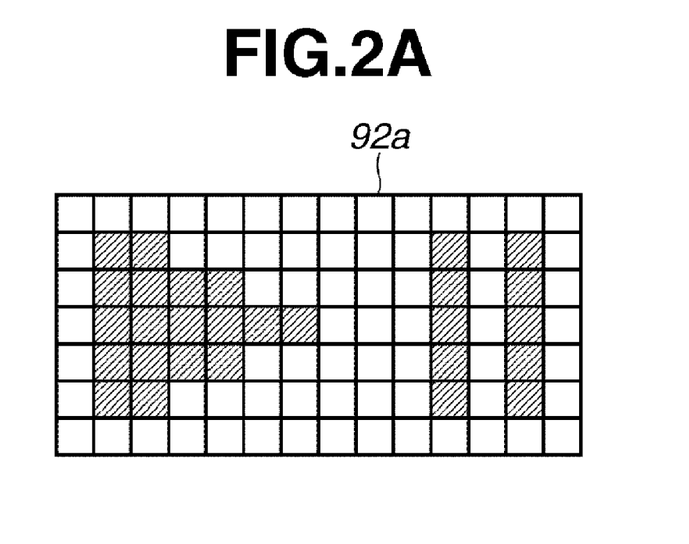
FIGS. 2A-B illustrate examples of bit map patterns of an operation icon.
Figure 2B:
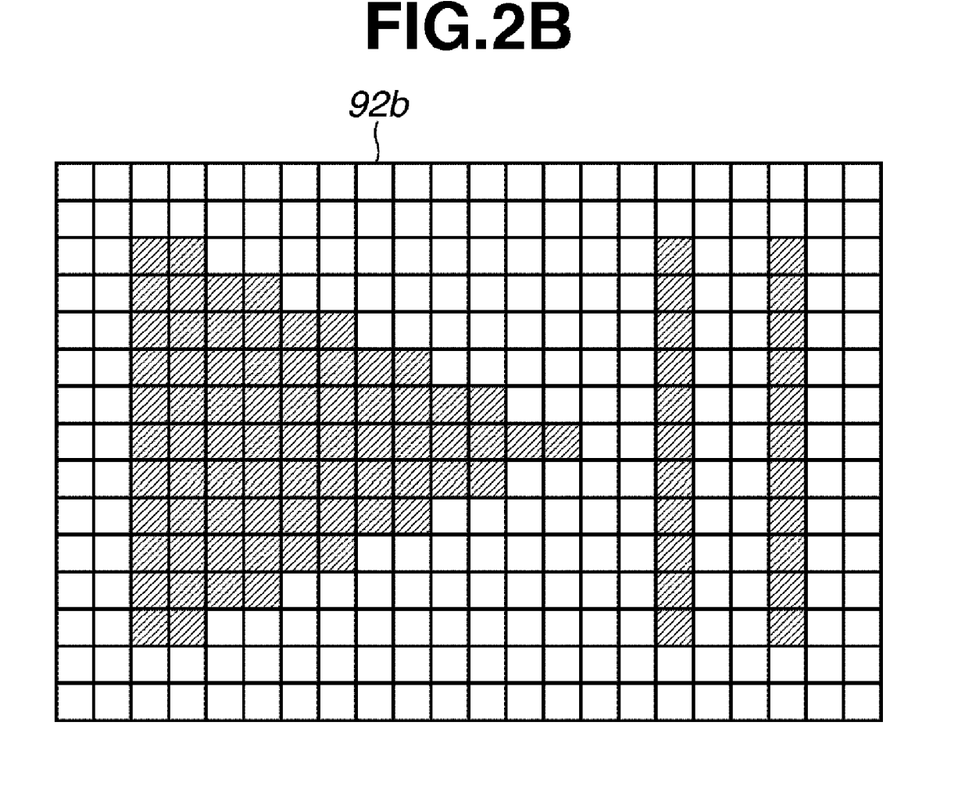

A ROM 56 stores a program corresponding to a processing procedure and fixed data such as a requisite table. As illustrated in FIGS. 2(A) and (B), the ROM 56 contains bit map data of an operation icon 92a which is a standard-size icon and an operation icon 92b which is an enlarged version of the operation icon 92a. It is to be noted that the ROM 56 may contain vector data in place of the bit map data of the operation icons 92a and 92b so that the CPU 50 can appropriately change size of the operation icon as appropriate. The CPU 50 and the ROM 56 function as an icon image-generating device adapted to generate an image signal of the standard-size operation icon 92a and the enlarged operation icon 92b.

A timer 58 measures a streaming time of the recording and reproduction unit 32 at regular intervals. A power detection unit 60 detects remaining battery capacity.

A connection detection unit 62 detects whether the video monitor 80 is connected to the output terminal 40 based on a DC bias potential of the output terminal 40 that changes when the video monitor 80 is connected to the output terminal 40, and notifies a result of the detection to the CPU 50.

Figure 3:
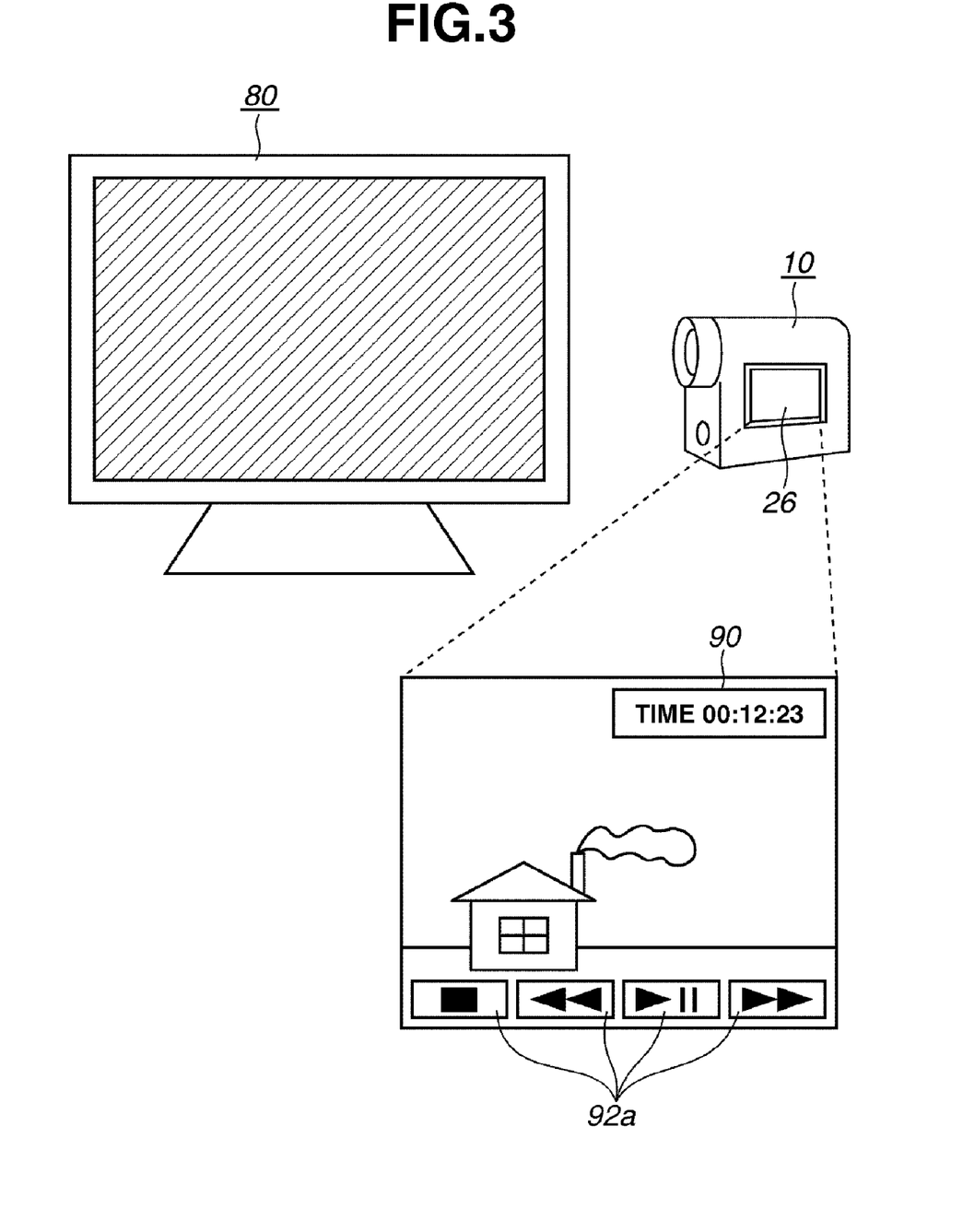
FIG. 3 illustrates an example of an LCD screen displaying a reproduced image when a video monitor is not connected to a video output terminal.
Figure 4:
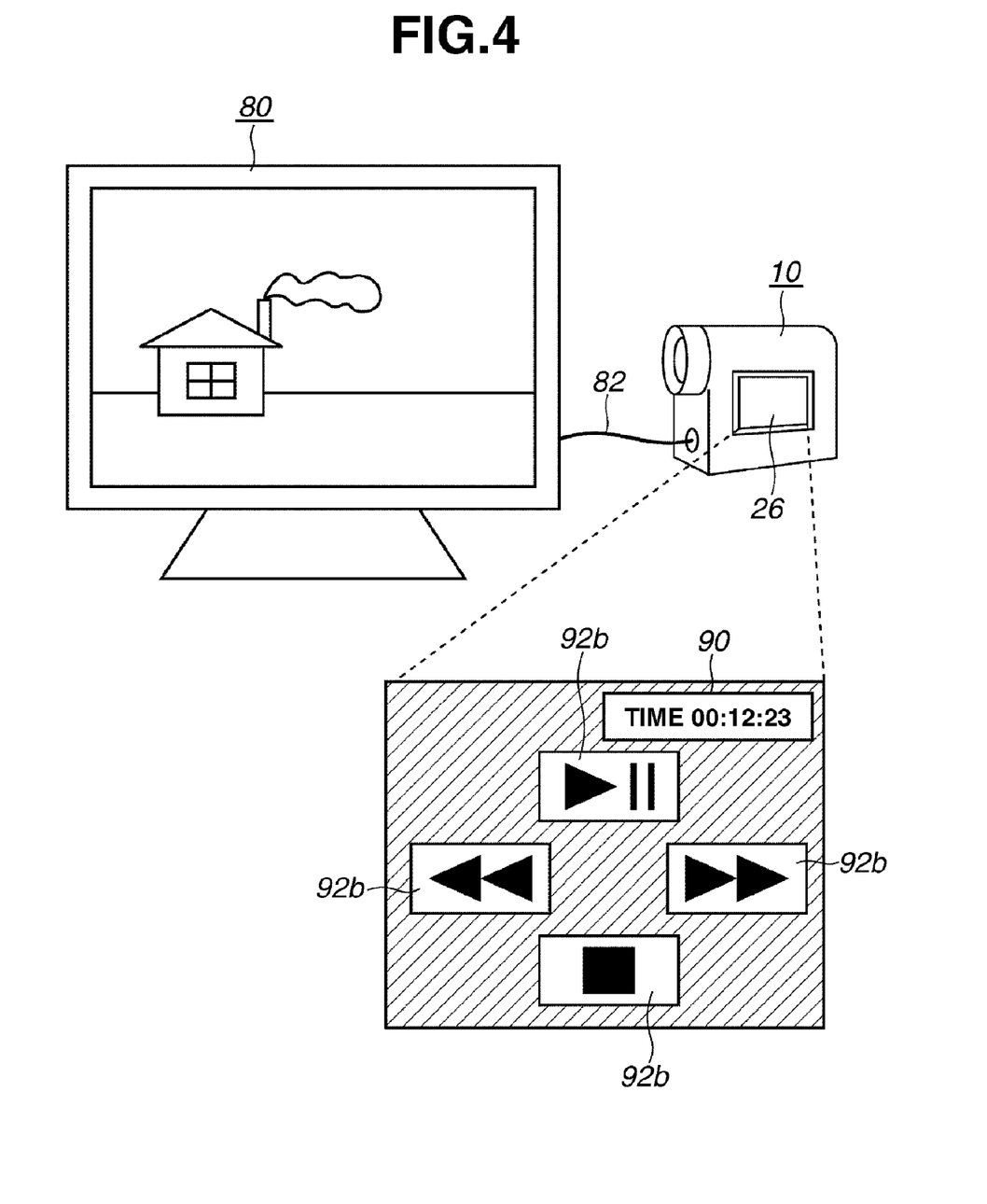
FIG. 4 illustrates an example of the LCD screen displaying a reproduced image when the video monitor is connected to the video output terminal.

FIG. 3 illustrates an example of a screen of an LCD 26 displaying a reproduced image when a video monitor 80 is not connected to the output terminal 40. FIG. 4 illustrates an example of a screen of an LCD 26 displaying a reproduced image when the video monitor 80 is connected to the output terminal 40. In FIG. 3, a time code 90 and the standard-size operation icon 92a are superposed on a reproduced image displayed on the screen of the LCD 26. In FIG. 4, the reproduced image is displayed on a screen of the video monitor 80 while the time code 90 and the enlarged operation icon 92b are displayed on the screen of the LCD 26. The CPU 50 supplies the standard-size operation icon 92a to the OSD control unit 24 when the video monitor 80 is not used. On the other hand, the CPU 50 supplies the enlarged operation icon 92b to the OSD control unit 24 when the video monitor 80 is used.

Figure 5:
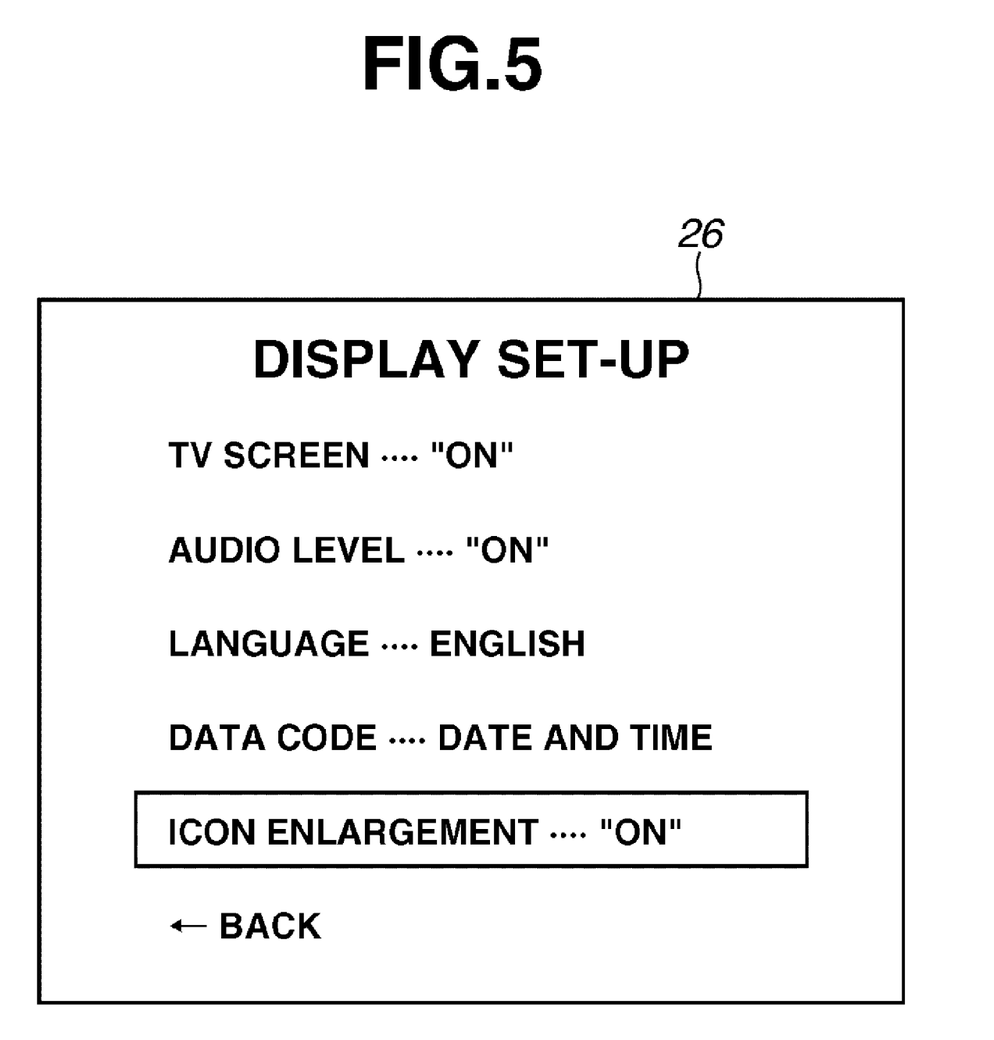
FIG. 5 illustrates an example of a menu screen displayed on the LCD.

FIG. 5 illustrates an example of a menu screen displayed on the LCD 26. The user can select the enlarged operation icon 92b by toggling a menu item provided on the menu screen "ON" or "OFF". For example, if "OFF" is selected, even if a connection of the video monitor 80 to the imaging apparatus 10 is detected by the connection detection unit 62, the standard-size operation icon 92a is always displayed on the LCD 26. If "ON" is selected, the enlarged operation icon 92b is displayed on the LCD 26 when a connection of the video monitor 80 to the imaging apparatus 10 is detected by the connection detection unit 62.

Now, an example of a basic operation of the imaging apparatus 10 in a shooting mode of the first exemplary embodiment will be described. In the shooting mode, the selector 22 selects an output of the camera signal processing unit 20. The image sensor 16 outputs an image signal which corresponds to an optical image of a subject formed by the shooting lens 14. This image signal is analog. Then, the A/D converter 18 converts the analog image signal output from the image sensor 16 to a digital signal. The camera signal processing unit 20 performs a known camera signal processing on the image signal output from the A/D converter 18. Then, the image data output from the camera signal processing unit 20 is transferred to the OSD control unit 24 via the selector 22. The OSD control unit 24 combines an image signal output from the selector 22 with various information (e.g., timer data, remaining battery capacity, shooting time provided from the CPU 50, and also an image of the standard-size operation icon 92a used for starting or stopping shooting operation), and then supplies the composite image to the LCD 26. Thus, the user can confirm the subject and its composition by the image displayed on the LCD 26.

When the user gives an instruction to start recording, the MPEG encoder 30 compresses and encodes the image data output from the camera signal processing unit 20, and sends the compressed image data to the recording and reproduction unit 32. The recording and reproduction unit 32 records the compressed image data on the recording medium 34. In this way, a compressed image data of a shot image is stored on the recording medium 34.

When the imaging apparatus 10 is in the reproducing mode, the selector 22 selects the output of the MPEG decoder 36. The recording and reproduction unit 32 reads compressed image data specified by the user from the recording medium 34 and sends the read data to the MPEG decoder 36. The recording and reproduction unit 32 also supplies a time code 90 of the compressed image data which is to be reproduced, to the CPU 50. The CPU 50 supplies the time code 90 to the OSD control unit 24 when necessary. The MPEG decoder 36 decompresses and decodes the compressed image data output from the recording and reproduction unit 32. The decoded image data is sent to the OSD control unit 24 through the selector 22.

The OSD control unit 24 superposes various information output from the CPU 50 (e.g., time code output from the recording and reproduction unit 32, the image of the standard-size operation icon 92a and the image of the enlarged operation icon 92b output from the ROM 56) over an image signal output from the selector 22, and then supplies the superposed image to the LCD 26. In this way, an image having the time code and the operation icon superposed over the reproduced image is displayed on the LCD 26.

If the video monitor 80 is connected to the output terminal 40, the NTSC encoder 38 converts the image data selected by the selector 22 into image data in NTSC format. The image data in NTSC format is sent to the video monitor 80 via the output terminal 40 and the cable 82, and then displayed as an image.

Figure 6:
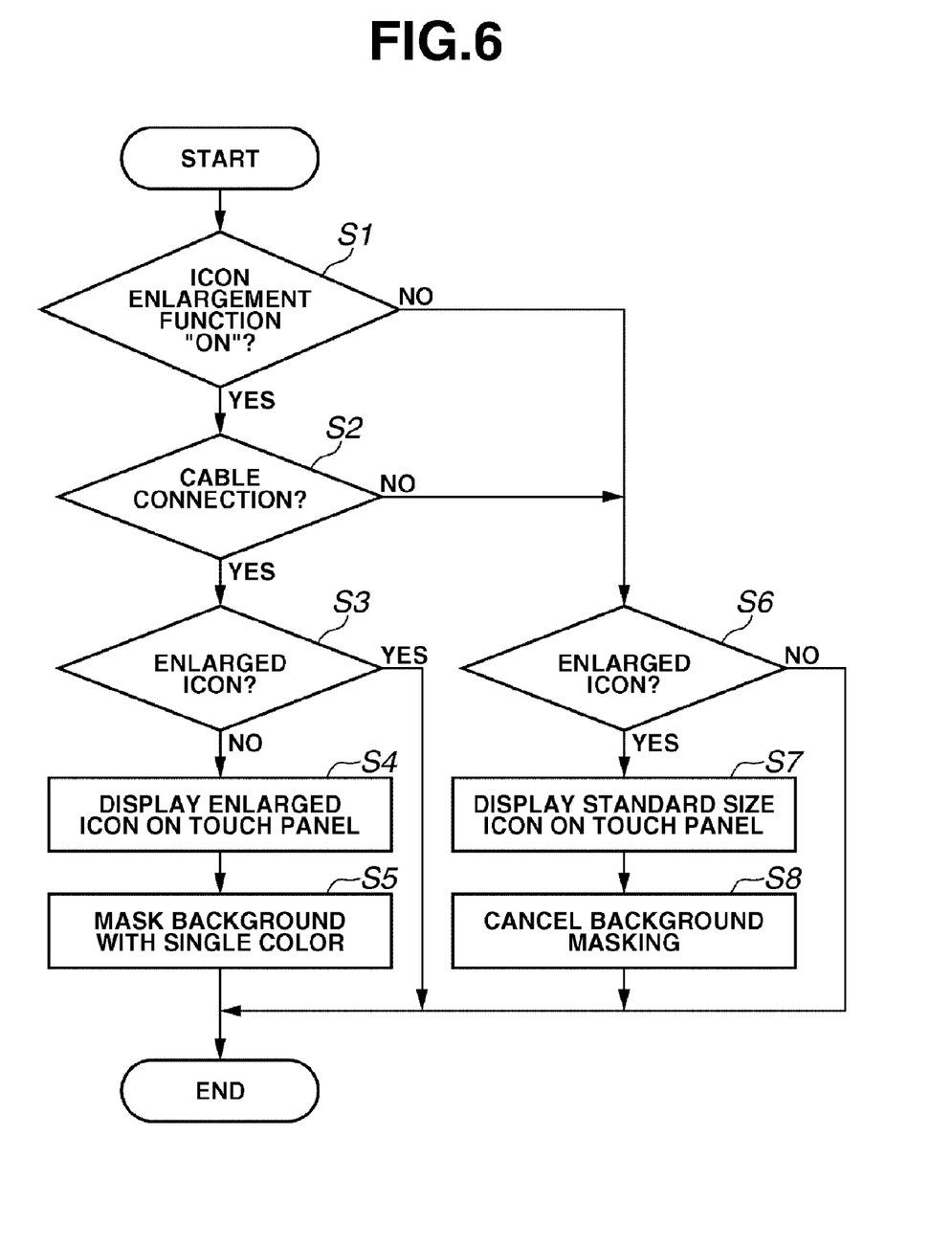
FIG. 6 illustrates an example operation flowchart for selecting an operation icon depending on a menu selection and whether a video monitor is connected.

Next, an example selecting operation of the operation icons 92a and 92b according to the first exemplary embodiment of the present invention will be described. FIG. 6 illustrates an operation flowchart for selecting the operation icon 92a or 92b depending on a menu selection and whether the video monitor 80 is connected as illustrated in FIG. 5.

In step S1, the CPU 50 determines whether the icon enlargement function is set to "ON". If the CPU 50 determines that the icon enlargement function is set to "ON" (YES in step S1), then in step S2, the CPU 50 determines whether an external electronic equipment, which is ordinarily the video monitor 80, is connected to the output terminal 40 via a connection detection unit 62.

If the video monitor 80 is connected to the output terminal 40 (YES in step S2), then in step S3, the CPU 50 determines whether the enlarged operation icon 92b is displayed on the LCD 26. If the standard-size operation icon 92a is displayed (NO in step S3), then in step S4, the CPU 50 reads the bit map data of the enlarged operation icon 92b from the ROM 56 and supplies the read data to the OSD control unit 24. In this way, in step S4, the enlarged operation icon 92b is displayed on the LCD 26. In step S5, the CPU 50 instructs the OSD control unit 24 to mask a background image or a reproduced image sent from the recording and reproduction unit 32 with a single color, for example, blue color so as to form a blue background. In this case, as illustrated in FIG. 4, the time code 90 and the enlarged operation icon 92b are displayed against the blue background on the LCD 26.

In step S1, if the icon enlargement function is set to "OFF" (NO in step S1) or even if the icon enlargement function is set to "ON" (YES in step S1), if the video monitor 80 is not connected to the output terminal 40 (NO in step S2), then in step S6, the CPU 50 determines whether the enlarged operation icon 92b is displayed on the LCD 26. If the enlarged operation icon 92b is displayed on the LCD 26 (YES in step S6), then in step S7, the CPU 50 reads the bit map data of the standard-size operation icon 92a from the ROM 56 and supplies the read data to the OSD control unit 24. In this way, in step S7, the standard-size operation icon 92a is displayed on the LCD 26. In step S8, the CPU 50 causes the OSD control unit 24 to cancel the masking by the single color background (e.g., blue background). In this way, the time code 90 and the standard size operation icon 92a are superposed over a reproduced image as illustrated in FIG. 3.

According to the first exemplary embodiment, when the video monitor 80 is connected to the output terminal 40, that is, when the user views the reproduced video with an external monitor, operation such as reproduction start or stop becomes easier for the user, since the enlarged operation icon 92b is displayed on the LCD 26 of the touch panel 28. This contributes to improving of operability of the touch panel 28. In other words, the touch panel 28 can be used as a controller dedicated to a reproducing operation. In addition, since the time code 90, etc. are superposed over the blue background, the user can easily check them.

Second Exemplary Embodiment

Figure 7:
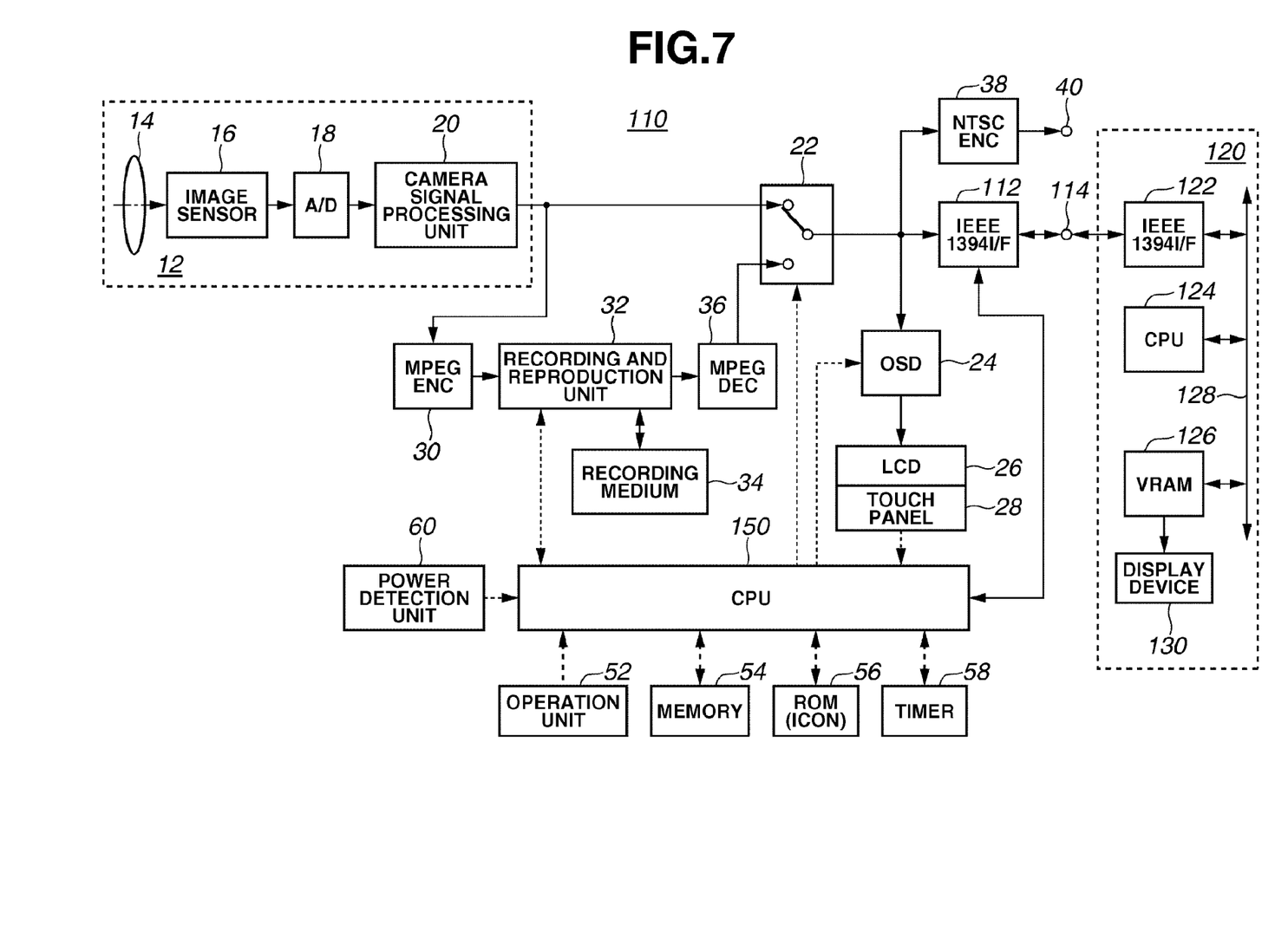
FIG. 7 illustrates a block diagram of an example imaging apparatus according to a second exemplary embodiment of the present invention.

FIG. 7 illustrates a block diagram of an imaging apparatus according to a second exemplary embodiment of the present invention. The components similar to those in FIG. 1 are denoted by the same reference numerals.

An imaging apparatus 110 illustrated in FIG. 7 includes an Institute of Electrical and Electronic Engineers (IEEE) 1394 interface 112 and a connection terminal 114 of the IEEE 1394 interface in addition to the components of the imaging apparatus 10. An output signal selected by the selector 22 is supplied to the IEEE 1394 interface 112. A CPU 150 has a communicating function with an IEEE 1394 device through the IEEE 1394 interface 112 in addition to the control function of the CPU 50.

A video monitor 120 or an image monitor is connected to the connection terminal 114. The video monitor 120 includes a CPU 124 adapted to control an IEEE 1394 interface 122 and the video monitor 120. The CPU 124 is capable of communicating with other IEEE 1394 device (i.e., the imaging apparatus 110), via the IEEE 1394 interface 122. The CPU 124 is also capable of receiving image data from the imaging apparatus 110 and sending the received image data to a video RAM (VRAM) 126. The IEEE 1394 interface 122, the CPU 124, and the VRAM 126 exchange data via a bus 128 to which they are connected. A display device 130 reads out the image data supplied to the VRAM 126 at a certain interval and displays the data as an image.

The CPU 150 of the imaging apparatus 110 confirms whether the IEEE 1394 device connected to the connection terminal 114 is a video displaying device using a command defined by the IEEE 1394 standard. The CPU 150 of the imaging apparatus 110 also detects whether the IEEE 1394 device connected to the connection terminal 114 is a video displaying device or an image displaying device.

Figure 8:
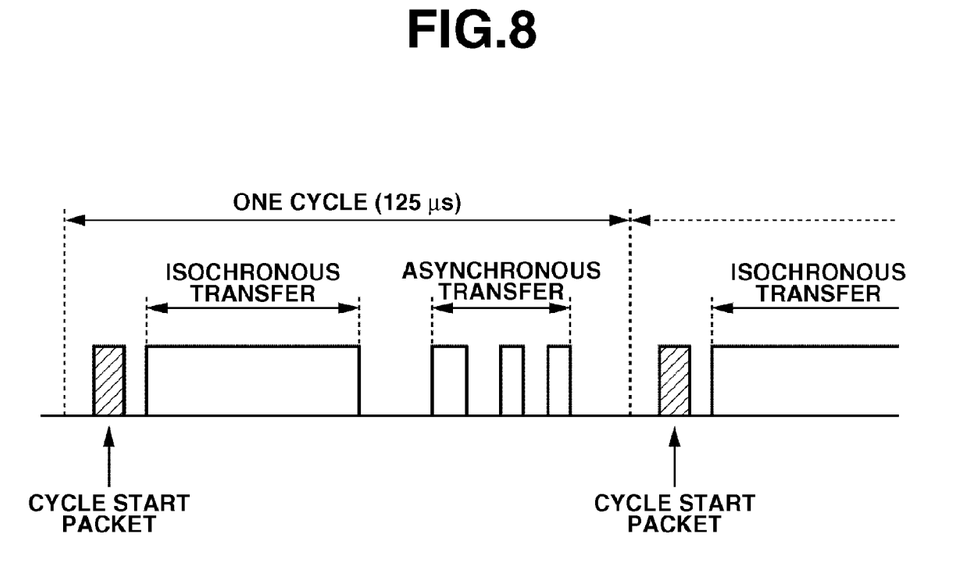
FIG. 8 illustrates a communication mode of Institute of Electrical and Electronics Engineers (IEEE) 1394.

As illustrated in FIG. 8, the IEEE 1394 interface offers bidirectional communications using two transfer modes, that is, an isochronous transfer mode for real-time data transfer and an asynchronous transfer mode for asynchronous data transfer. The isochronous transfer is used for transmission of multi media data. When both the isochronous transfer and the asynchronous transfer are mixed, 100 μsec within one cycle frame of 125 μsec is used for isochronous communication and remaining time is used for asynchronous transfer.

The CPU 150 sends an audio video control (AV/C) command to the IEEE 1394 device connected to the connection terminal 114 through the IEEE 1394 interface 112. According to the second exemplary embodiment, the video monitor 120 is used as the IEEE 1394 device. Then, the CPU 150 receives a response from the video monitor 120.

Figure 9:
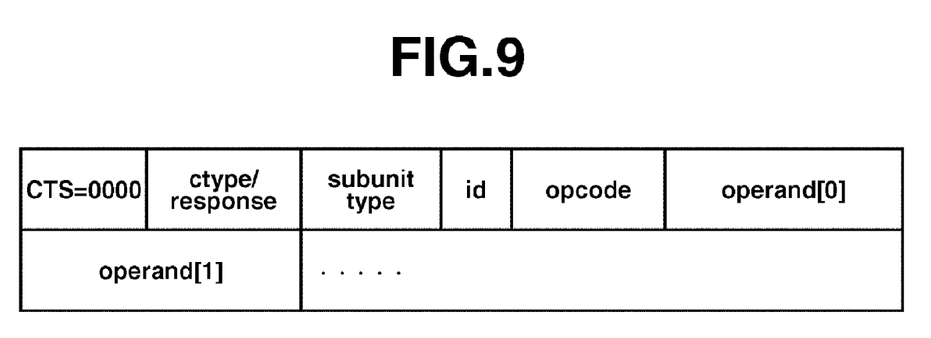
FIG. 9 illustrates a command frame of an audio video control (AV/C) command of IEEE 1394.
Figure 10:
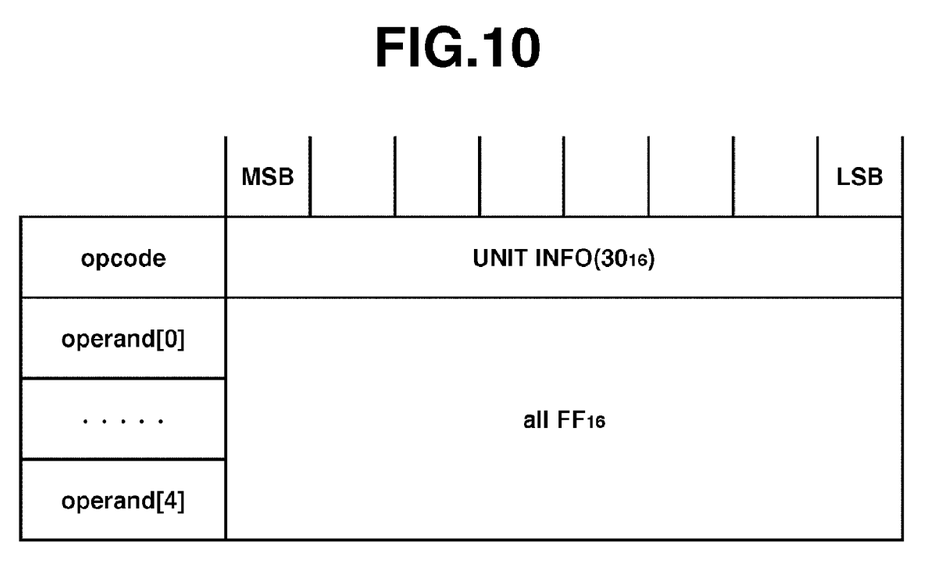
FIG. 10 illustrates a format of a UNIT INFO status command.
Figure 11:
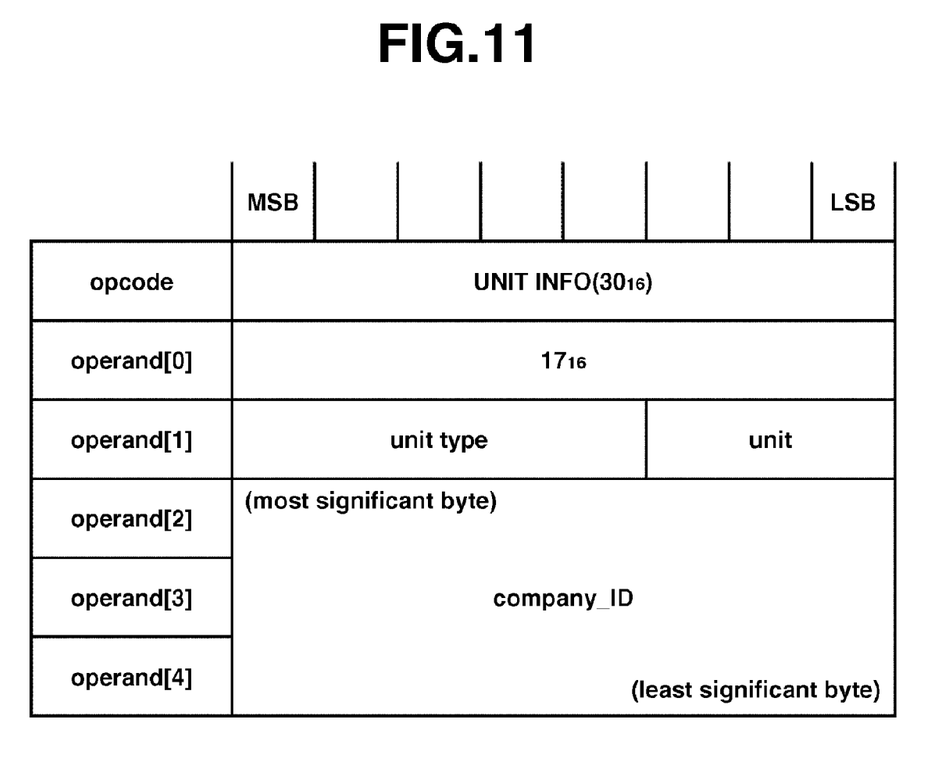
FIG. 11 illustrates a response format of the UNIT INFO status command.
Figure 12:
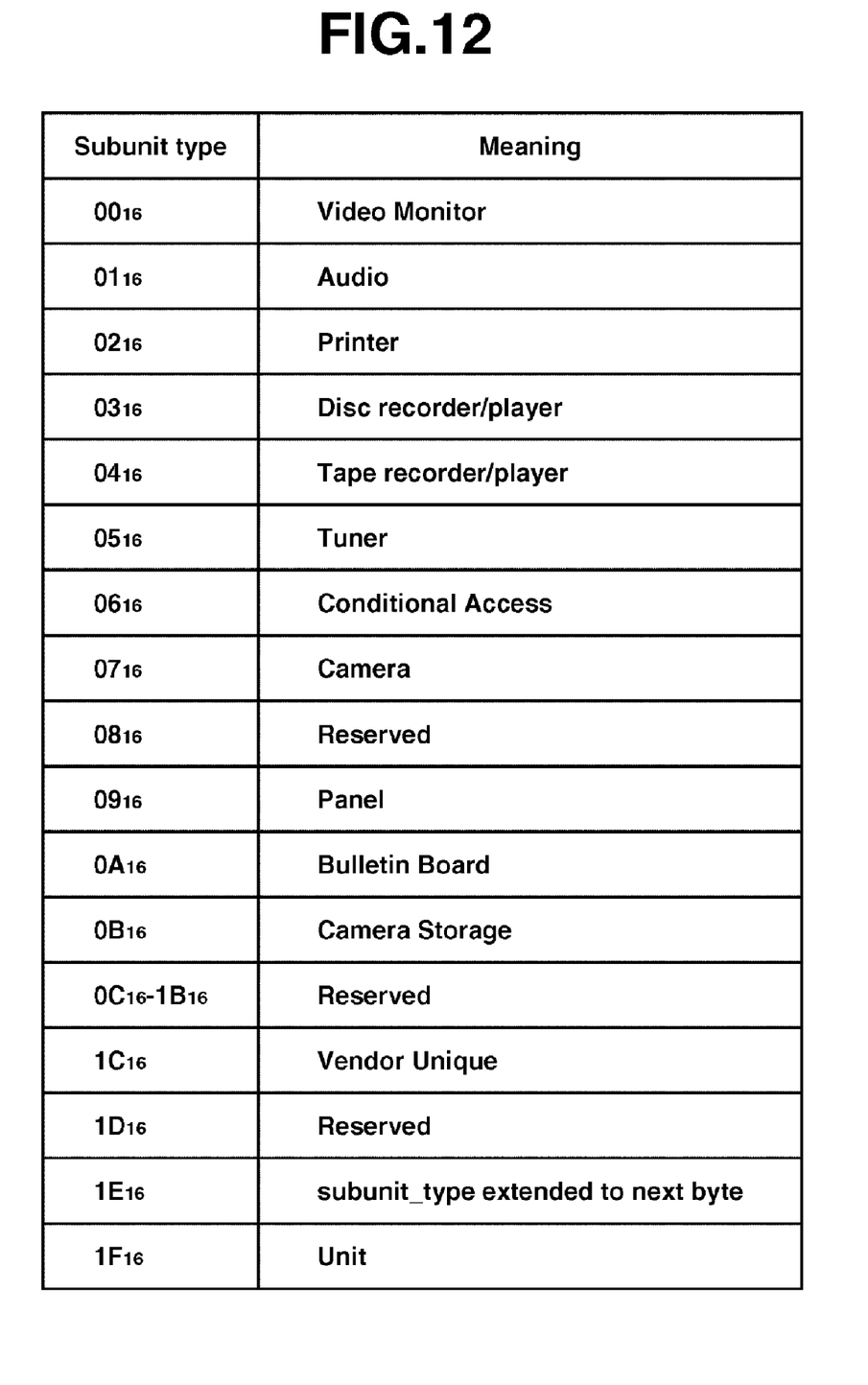
FIG. 12 is a table illustrating a unit type and a corresponding device.

The AV/C command of IEEE 1394 and a response to the AV/C command are briefly described referring to FIGS. 9 to 12. FIG. 9 illustrates an AV/C command frame of IEEE 1394. FIG. 10 illustrates a format of a UNIT INFO status command. FIG. 11 illustrates a response format to the UNIT INFO status command. FIG. 12 shows a table illustrating a unit type and a corresponding device.

When the IEEE 1394 interface 112 sends an AV/C command to the video monitor 120, the video monitor 120 returns a response including unit_type=$00_{16}$ (Video Monitor) to the IEEE 1394 interface 112. From this response, the CPU 150 can determine that an image displaying device, here the video monitor 120, is connected to the connection terminal 114. The CPU 150 can also recognize that other electronic devices such as audiovisual equipment, printer, and tuner are connected.

Figure 13:
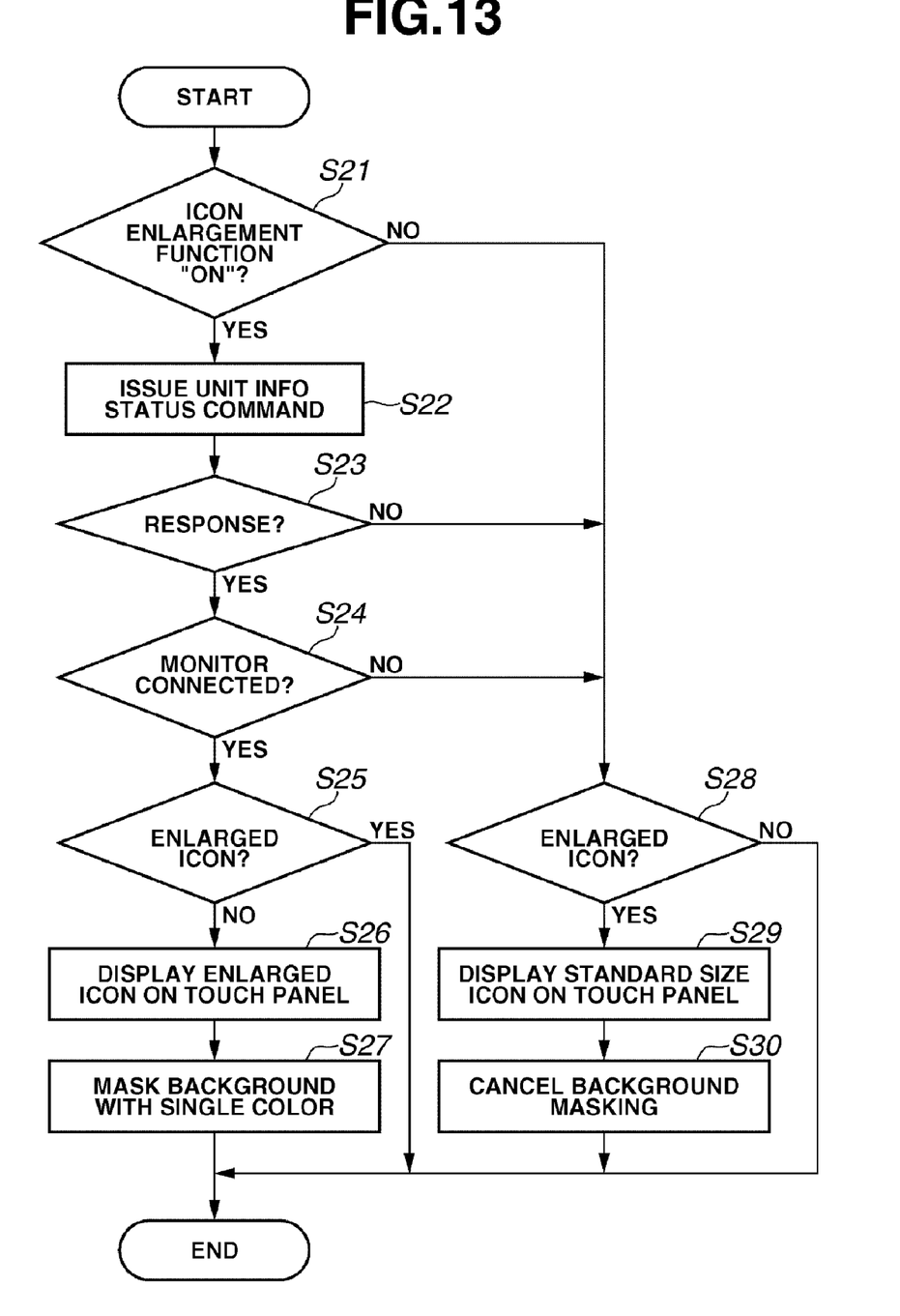
FIG. 13 illustrates an operation flowchart of a process for selecting an operation icon depending on a menu selection and whether a video monitor is connected to a video monitor according to the second exemplary embodiment of the present invention.

FIG. 13 illustrates an operation flowchart of the imaging apparatus 110 concerning a selection of the operation icon 92a or 92b depending on a menu selection and whether the video monitor 120 is connected.

In step S21, the CPU 150 determines whether the icon enlargement function is set to "ON". If the CPU 150 determines that the icon enlargement function is set to "ON" (YES in step S21), then in step S22, the CPU 150 instructs the IEEE 1394 interface 112 to issue a UNIT INFO status command to the IEEE 1394 device connected to the connection terminal 114. In step S23, if the IEEE 1394 interface 112 receives a response within a certain period after the issuance of the command signal (YES in step S23), the IEEE 1394 interface 112 transfers the response to the CPU 150. In step S24, the CPU 150 determines based on a value of unit_type whether the IEEE 1394 device connected to the connection terminal 114 is the video monitor 120. The video monitor 120 returns a response of unit_type=$00_{16}$ (Video Monitor).

If the video monitor 120 is connected to the connection terminal 114 (YES in step S24), then in step S25, the CPU 150 determines whether the enlarged operation icon 92b is displayed on the LCD 26. If the standard-size operation icon 92a is displayed (NO in step S25), then in Step S26, the CPU 150 reads the bit map data of the enlarged operation icon 92b from the ROM 56 and supplies the data to the OSD control unit 24. In this way, the enlarged operation icon 92b is displayed on the LCD 26. In step S27, the CPU 150 instructs the OSD control unit 24 to mask a background image or a reproduced image sent from the recording and reproduction unit 32 with a single color, for example, blue color to form a blue background. In this case, as illustrated in FIG. 4, the time code 90 and the enlarged operation icon 92b are displayed against a blue background on the LCD 26.

If the icon enlargement function is set to "OFF" in step S21 (NO in step S21), if the CPU 150 does not receive the response within a certain period of time (NO in step S23), or if the connection terminal 114 is not connected to the video monitor 120 (NO in step S24), then in step S28, the CPU 150 determines whether the enlarged operation icon 92b is displayed on the LCD 26. If the enlarged operation icon 92b is displayed on the LCD 26 (YES in step S28), the CPU 150 reads the bit map data of the standard-size operation icon 92a from the ROM 56 and supplies the bit map data to the OSD control unit 24. In this way, in step S29, the standard-size operation icon 92a is displayed on the LCD 26. In step S30, the CPU 50 causes the OSD control unit 24 to cancel the masking of a single color background (e.g., blue background). In this way, the time code 90 and the standard size operation icon 92a are superposed over a reproduced image on the screen of the LCD 26 as illustrated in FIG. 3.

According to the second exemplary embodiment, when the user connects the imaging apparatus 110 to an external monitor via an IEEE 1394 interface, since the enlarged operation icon 92b is displayed on the LCD 26 of the touch panel 28 similar to the case where the external monitor is connected via an AV cable, operations such as reproduction start or stop become easier for the user. This contributes to improving of operability of the touch panel 28. In other words, the touch panel 28 can be used as a controller dedicated to reproducing operation. In addition, since the time code 90, etc. are superposed over the blue background, the user can easily check data on display.

In the second exemplary embodiment, the IEEE 1394 interface is described as an example of a digital interface or a digital transmission system. However, digital interfaces such as high-definition multimedia interface (HDMI) and wireless local area network (WLAN) can also be used in confirming whether the device connected is an image display apparatus. Accordingly, the present invention is also effective when digital interfaces such as HDMI are used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-351531 filed Dec. 27, 2006, which is hereby incorporated by reference herein in its entirety.

What is claimed is:

1. An image reproducing apparatus, comprising:
    a reproduction unit configured to reproduce a recorded image from a recording medium and output a reproduced image signal;
    an image outputting unit configured to output the reproduced image signal to an external equipment;
    a connection detection unit configured to detect a connection of the image outputting unit with the external equipment;
    an image displaying unit configured to display a first operation icon of a first size when the external equipment is not connected to the image outputting unit and display a second operation icon of a second size when the external equipment is connected to the image outputting unit, according to a detection result of the connection detection unit, wherein the second operation icon of the second size has a same operation function as the first operation icon and is larger than the first size;
    a touch panel configured to transmit an image displayed by the image displaying unit; and
    an operation accepting unit configured to accept an operation of the touch panel performed in an area corresponding to a size of an operation icon displayed on the image displaying unit.

2. The image reproducing apparatus according to claim 1, further comprising:
    an icon image generation unit which can generate an image signal of the first and the second operation icons; and
    a superposing unit adapted to superpose an image signal of either the first or the second operation icon output from the icon image generation unit over the reproduced image signal or a predetermined background image signal and supply a superposed image signal to the image displaying unit.

3. The image reproducing apparatus according to claim 2, wherein the superposing unit superposes an image signal of the first operation icon over the reproduced image signal when the external equipment is not connected to the image outputting unit and superposes an image signal of the second operation icon over the predetermined background image signal when the external equipment is connected to the image outputting unit.

4. The image reproducing apparatus according to claim 1, wherein the image outputting unit includes a digital interface;
    wherein the connection detection unit issues a command for determining a type of the external equipment and receives a response from the external equipment through the digital interface; and
    wherein the superposing unit superposes the image signal of the first operation icon over the reproduced image signal when an image displaying equipment including an image displaying function is not connected as the external equipment to the image outputting unit, and superposes the image signal of the second operation icon over the predetermined background image signal when the image displaying equipment is connected to the image outputting unit.

5. The image reproducing apparatus according to claim 1, further comprising a setting unit configured to set the first operation icon or the second operation icon to be displayed on the image displaying unit when the external equipment is connected to the image outputting unit.

6. A method of controlling an image reproducing apparatus which includes a reproduction unit configured to reproduce a recorded image from a recording medium and output a reproduced image signal, an image outputting unit configured to output the reproduced image signal to an external equipment, a connection detection unit configured to detect a connection of the image outputting unit with the external equipment, an image displaying unit configured to display an operation icon, and a touch panel configured to transmit an image displayed by the image displaying unit;
    the method comprising:
    controlling the image reproducing apparatus to display a first operation icon of a first size on the image displaying unit as the operation icon according to a result of a detection by the connection detection unit when the external equipment is not connected to the image outputting unit; and
    controlling the image reproducing apparatus to display a second operation icon of a second size on the image displaying unit according to a result of detection by the connection detection unit when the external equipment is connected to the image outputting unit, wherein the second operation icon of the second size has a same operation function as the first operation icon and is larger than the first size.

* * * * *